(12) United States Patent  (10) Patent No.: US 7,873,997 B2
Belenky et al.  (45) Date of Patent: Jan. 18, 2011

(54) DETERMINISTIC PACKET MARKING

(75) Inventors: Andrey Belenky, Brooklyn, NY (US); Nirwan Ansari, Montville, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1632 days.

(21) Appl. No.: 11/079,453

(22) Filed: Mar. 14, 2005

(65) Prior Publication Data

US 2005/0204171 A1    Sep. 15, 2005

Related U.S. Application Data

(60) Provisional application No. 60/552,645, filed on Mar. 12, 2004, provisional application No. 60/552,647, filed on Mar. 12, 2004, provisional application No. 60/553,212, filed on Mar. 15, 2004.

(51) Int. Cl.
 *H04L 29/14* (2006.01)
(52) U.S. Cl. ..................................... 726/22
(58) Field of Classification Search ............. 713/153, 713/160, 162, 168
See application file for complete search history.

(56) References Cited

U.S. PATENT DOCUMENTS

| 6,978,223 | B2 | 12/2005 | Milliken |
| 6,981,158 | B1 | 12/2005 | Sanchez et al. |
| 7,200,105 | B1 | 4/2007 | Milliken et al. |
| 7,565,426 | B2 * | 7/2009 | Jones et al. ............. 709/224 |
| 2004/0093521 | A1 | 5/2004 | Hamadeh et al. |

| 2005/0086520 | A1 | 4/2005 | Dharmapurikar et al. |

FOREIGN PATENT DOCUMENTS

WO    WO 01/59584 A1 *    8/2001

OTHER PUBLICATIONS

A. Belenky and N. Ansari, On IP traceback, IEEE Commun. Mag., Jul. 2002 vol. 41, No. 7.
D.X. Song and A. Perrig, Advanced and authenticated marking schemes for IP traceback, Proc. of INFOCOM 2001, 2001, pp. 878-886, vol. 2.
D. Dean et al., An algebraic approach to IP traceback, ACM Trans. on Information and System Security, (TISSEC), May 2002, pp. 1190137, vol. 5, No. 2.
T.W. Doeppner, Using router stamping to identify the source of IP packets, Proc. of 7th ACM Inter. Conf. on Computer Comm. and Networks, Nov. 2000, pp. 184-189.
M. Bellovin, ICMP traceback message, IETF Draft, Mar. 2000, [Online]. Available: http//www.research.att.com/smb/papers/draft-bellovin-itrace-00.txt.
S.F. Wu et al., On design and evaluation of 'intention-driven' ICMP traceback, Proc. of 10th Inter. Conf. on Computer Comm. and Networks, Oct. 2001, pp. 159-165.

(Continued)

*Primary Examiner*—Minh Dinh
(74) *Attorney, Agent, or Firm*—Connolly Bove Lodge & Hutz LLP

(57) ABSTRACT

The deterministic packet marking (DPM) method is based on marking packets with the partial address information of ingress interface only. The attack victim is able to recover the complete address(es) information after receiving several packets from a particular attacking host or hosts. The full path is not really essential for the traceback since it can be different for different packets for different reasons.

21 Claims, 7 Drawing Sheets

OTHER PUBLICATIONS

R. Stone, Center Track: An IP overlay network for tracking DoS floods, Proc. of 9th USENIX Security Symposium, Aug. 2000.

A.C. Snoren et al., Single-packet IP traceback, IEEE/ACM Trans. Networking. Dec. 2002, pp. 721-734, vol. 10, No. 6.

S. Matsuda et al., Design and implementation of unauthorized access tracing system, Proc. of the 2002 Symposium on Applications and the Internet, Jan./Feb. 2002, pp. 74-81.

T. Baba and S. Matsuda, Tracing network attacks to their sources, IEEE Internet Comput., Mar./Apr. 2002, pp. 20-26, vol. 6, No. 2.

H. Burch and B. Cheswick, Tracing anonymous packets to their approximate source, Proc. of 2000 USENIX LISA Conference, Dec. 2000, pp. 319-327.

H. Chang et al., DecIdUouS: Decentralized source identification for network intrusions, Proc. of 6th IFEP/IEEE International Symposium on Integrated Net. Management, May 1999, pp. 701-714.

H. Cheng et al., Design and implementation of a real-time decentralized source identification system for untrusted ip packets, Proc. of the DARPA Information Survivability Conference & Exposition, Jan. 2000, pp. 100-111, vol. 2.

A. Belenky and N. Ansari, IP traceback with deterministic packet marking, IEEE Commun. Lett., Apr. 2003, 162-164 vol. 7 No. 4.

A. Belenky and N. Ansari, Tracing multiple attackers with deterministic packet marking (DPM), Proc. of IEEE PacRim, Aug. 2003, to be published.

S. Savage et al., Network support for IP Traceback, IEEE/ACM Trans. Networking, Jun. 2001, pp. 226-237, vol. 9, No. 3.

D. Moore et al., Inferring internet denial of service activity, Proc. of 10th USENIX Service Symposium, 2001, pp. 9-22.

R.K.C. Chang, Defending against flooding-based distributed denial-of-service attacks: A tutorial, IEEE Commun. Mag. Oct. 2002, pp. 42-51, vol. 40, No. 10.

S.C. Lee and C. Sheilds, Technical, Legal, and Societal challenges to automated attack Traceback, IT Profesional, May/Jun. 2002, 12-18, Vo. 4, No. 3.

L. Subramanian et al., Characterizating the Internet hierarchy from multiple vantage points, Proceedings of INFOCOM 2002 Twenty-First Annual Joint Conference of the IEEE Computer and Communications Societies, Jun. 2002, pp. 618-627, vol. 2.

P. Ferguson and D.Senie, Network ingress filtering: defeating denial of service attacks which employ IP source address spoofing, RFC 2827, May 2000.

P. Srisuresh and K. Egevang, Traditional IP network address translator (traditional NAT), RFC 3022, Jan. 2001.

D. Wei and N. Ansari, "Implementing IP Traceback in the Internet—An ISP Perspective," Proc. 3rd Annual IEEE Workshop on Information Assurance, West Point, NY, pp. 326-332, Jun. 17-19, 2002.

Y. Kim, J.-Y. Jo, and F. Merat, "Defeating Distributed Denial-of-Service Attack with Deterministic Bit Marking," IEEE GLOBECOM, pp. 1363-1367, Dec. 2003.

Andrey Belenky, "IP Traceback with Deterministic Packet Marking (DPM)," Ph.D. dissertation, New Jersey Institute of Technology, Oct. 2003.

* cited by examiner

FIG. 2

*Marking procedure at router R, edge interface A:*
    for $y = 0$ to $1$
        $Marks[y].\text{Seg\_Num} := y$
        $Marks[y].\text{A\_bits} := A[y]$
    for each incoming packet $w$
        let $x$ be a random integer from $[0,1]$
        write $Marks[x]$ into $w.\text{Mark}$

*Ingress address reconstruction procedure at V:*
    for each attack packet $w$
        $IngressTbl[w.\text{Mark.Seg\_Num}] := w.\text{Mark.Seg\_Num}$

FIG. 7

*Marking procedure at router R, edge interface A:*
   for $z = 0$ to $f - 1$
      $Digest := H_z(A)$
      for $y = 0$ to $k - 1$
         $Marks[z \times k + y].Hash\_num := z$
         $Marks[z \times k + y].Digest := Digest$
         $Marks[z \times k + y].Seg\_Num := y$
         $Marks[z \times k + y].A\_bits := A[y]$
   for each incoming packet $w$
      let $x$ be a random integer from $[0, f \times k)$
      write $Marks[x]$ into $w.Mark$

*Mark Recording procedure at victim V:*
   for each attack packet $w$
      $Part := w.Mark.Hash\_num$
      $Area := w.Mark.Digest$
      $Seg := w.Mark.Seg\_Num$
      $Bit := w.Mark.A\_bits$
      $RecTbl[Part, Area, Seg, Bit] := \text{'1'}$

*Address Recovery procedure at victim V:*
   for $Area = 0$ to $2^d - 1$
      for $Bit_0 = 0$ to $2^a - 1$
         if $RecTbl[0, Area, 0, Bit_0] == \text{'1'}$ then
            $\vdots$
            if $RecTbl[0, Area, k - 2, Bit_{k-2}] == \text{'1'}$ then
               for $Bit_{k-1} = 0$ to $2^a - 1$
                  if $RecTbl[0, Area, k-1, Bit_{k-1}] == \text{'1'}$ then
                     $Prm := Bit_0 . Bit_1 . \ldots . Bit_{k-1}$
                     $Digest := H_0(Prm)$
                     if $Area == Digest$ then
                        for $Part = 0$ to $f - 1$
                           for $Seg = 0$ to $k - 1$
                              if $RecTbl[Part, H_{Part}(Prm), Seg, Bit_{Seg}] \neq \text{'1'}$ then
                                 $False\_flag := \text{'1'}$
                     if $False\_flag \neq \text{'1'}$ then
                       $Prm \Rightarrow IngressTbl$

DETERMINISTIC PACKET MARKING

RELATED APPLICATIONS

This application claims priority from U.S. Provisional patent Application Ser. No. 60/552,645, filed Mar. 12, 2004; Ser. No. 60/552,647 filed Mar. 12, 2004, and 60/553,212 filed Mar. 15, 2004.

FIELD OF INVENTION

This invention relates generally to methodology useful in securing the Internet infrastructure, and more specifically relates to methods for tracing internet attacks back to their source or sources.

BACKGROUND OF INVENTION

In recent years, much interest and consideration has been paid to the topic of securing the Internet infrastructure that continues to become a medium for a broad range of transactions. A number of approaches to security have been proposed, each attempting to mitigate a specific set of concerns. The specific threat, which is the main focus of this application, is anonymous attacks. In anonymous attacks, the identity of the attacker(s) is not immediately available to the victim since the Source Address (SA) field in the attack packets is spoofed. (Distributed) Denial of Service ((D)DoS) attacks are anonymous attacks, which currently attract much attention since there is no obvious way to prevent them or to trace them.

Currently there are several ways of dealing with anonymous attacks. They include source address filtering, SYN Flood Protection, and implementing a BlackHole Router server. Source address filtering, introduced in P. Ferguson and D. Senie, *Network Ingress Filtering: defeating denial of service attacks which employ IP source address spoofing*, RFC 2827, May, 2000, prevents packets with values of the SA field outside the preset appropriate range from entering the Internet. If deployed on every ingress interface, this would drastically reduce the number of anonymous packets in the Internet. Unfortunately, source address filtering incurs high overhead and administrative burden and is ineffective, unless carried out almost everywhere. SYN Flood Protection monitors half-open TCP connections and does not allow more than a certain number of them to exist simultaneously. SYN Flood protection prevents only SYN Flood type (D)DoS attacks and is useless against other types of anonymous attacks. Finally, the ISPs can determine the interface, where the DoS attack packets entered its network, by "Black Holing" a router on its network, if the customer reports the attack. This method involves human interaction, works only for the backscatter attacks, as discussed in D. Moore, G. M. Voelker and S. Savage, *Inferring Internet Denial of Service Activity*, Proc. of 10th {USENIX} Security Symposium, 2001, pp. 9-22, must be performed while the attack is still in progress, and is limited to the boundaries of the given ISP.

The currently available methods for dealing with anonymous attacks are not comprehensive. They either deal with a very limited set of the problems or are too expensive to implement and enforce. While it may be simply impossible to prevent attackers from attempting an attack, it might be possible to lessen, or even completely eliminate the effects of the attack by not allowing the packets to reach the victim(s). This is the proactive approach discussed in detail in R. K. C. Chang, *Defending against Flooding-Based Distributed Denial-of-Service Attacks: A Tutorial*, IEEE Commun. Mag, Vol. 40, No. 10, pp. 42-51, October 2002. The reality, however, is that prevention of all attacks on the Internet is far from reality. When prevention fails, a mechanism to identify the source(s) of the attack is needed to at least insure accountability for these attacks. This is the motivation for designing IP Traceback schemes.

After several high-profile DDoS attacks on major U.S. web sites in 2000, numerous EP traceback approaches have been suggested to identify the attacker(s). See A. Belenky and N. Ansari, *On IP traceback, IEEE Commun. Mag*, vol 41, no, 7, pp. 142-153, July 2003. *IP Traceback* is defined in Chang (op. cit.) as identifying a source of any packet on the Internet. The previously proposed schemes can be categorized in four broad groups. One group of the solutions relies on the routers in the network to send their identities to the destinations of certain packets, either encoding this information directly in rarely used bits of the IP header, or by generating a new packet to the same destination. The biggest limitation of solutions of this type is that they are focused only on flood-based DoS and DDoS attacks, and cannot handle attacks comprised of a small number of packets. Moreover, for large scale DDoS attacks, these schemes are not very effective.

The second group involves logging some fields of every packet, or the digest of every packet on all the routers that a packet traverses. During the traceback, all of the routers are polled and the path of a given packet is reconstructed by correlating the routers, which have stored the information about this packet. The solutions of this group are not easily scalable, have relatively high ISP involvement, and have no post-mortem traceback capabilities. The third group involves the centralized management of the traceback process and changing the routing in the network with tunneling to be able to identify the packets' origin. The shortcomings of these schemes are high ISP involvement and high bandwidth and processing overhead associated with tunneling. The final group is referred to as the state of network inference schemes. Controlled flooding, described in H. Burch and B. Cheswick, *Tracing Anonymous Packets to Their Approximate Source*, Proc. of 2000 USENIX LISA Conference, December 2000, pp. 319-327, is the only scheme in this group. The scheme only works for DoS attacks. The attack path is determined while the attack is still in progress by systematically loading different links on the network and observing the effect on the victim. If loading of a particular link results in decrease in the rate of the attack traffic, then this link is on the attack path. Controlled flooding is limited to tracing DoS attacks only, and it is manual. It also utilizes a questionable approach of inducing DoS attacks for the purposes of traceback.

SUMMARY OF INVENTION

Now in accordance with the present invention a method for IP Traceback is disclosed which is based on Deterministic Packet Marking (DPM). The method is based on marking packets with the partial address information of ingress interface-only. The attack victim is able to recover the complete address(es) information after receiving several packets from a particular attacking host or hosts. The full path is not really essential for the traceback since it can be different for different packets for different reasons. The approach is scalable, simple to implement, and introduces no bandwidth and practically no processing overhead on the network equipment. It is capable of tracing thousands of simultaneous attackers during a DDoS attack. As disclosed in our concurrently filed applications Ser. No. 11/079,451 and Ser. No. 11/079,452, the entire disclosure of which are incorporated herein by reference. DPM is capable of tracing back to the slaves responsible for DDoS attacks that involve reflectors. Tracing back to the slaves cannot be done by other existing schemes. Most of the processing is done at the victim. The traceback process can be performed post-mortem allowing for tracing the attacks that may not have been noticed initially, or the attacks which would deny service to the victim so that traceback is impossible in real time. The involvement of the Internet Service Providers (ISPs) is very limited, and changes to the infrastructure and operation required to deploy DPM are minimal. DPM performs the traceback without revealing the internal topology of the provider's network, which is a desirable quality of a traceback scheme.

DESCRIPTION OF DRAWINGS

The invention is diagrammatically illustrated, by way of example, in the drawings appended hereto, in which:

FIG. 2 illustrates the Pseudo code for the basic DPM;

FIG. 7 shows the pseudo code for the modified multiple digest DPM algorithm.

DESCRIPTION OF PREFERRED EMBODIMENTS

The basic DPM is a packet marking algorithm. We first consider the general principle behind DPM and discusses the most basic implementation of the scheme.

By "Deterministic Packet Marking" we refer to the fact that every packet traversing a DPM-enabled router is marked, i.e., the packet is inscribed with partial information of the router interface, as opposed to "Probabilistic Packet Marking" in which each packet is marked by a router along the traversed path with a probability, say, 0.04 (4%), i.e., some packets may not be marked at all.

The two key assumptions applicable to the method are (1) that an attacker may generate any packet; and (2) that routers are both CPU and memory limited.

Figure 1:
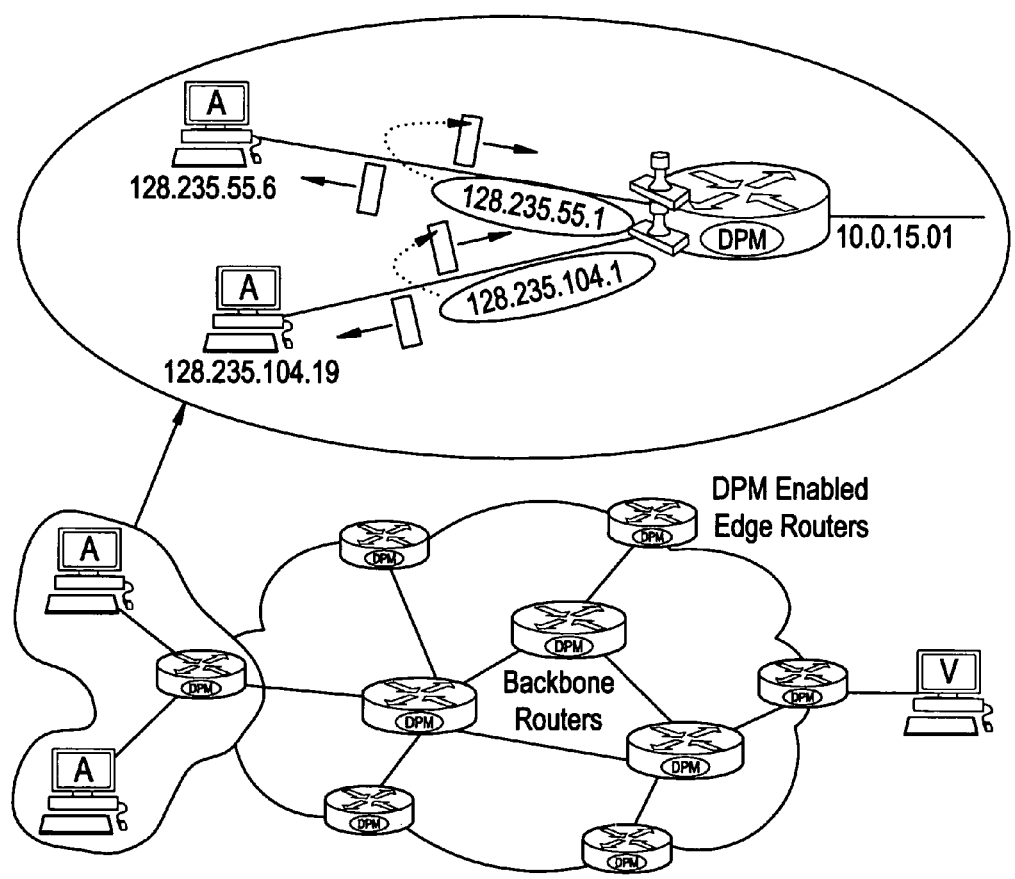
FIG. 1 depicts the method for basic deterministic packet marking (DPM)

The 16-bit packet Identification (ID) field and 1-bit Reserved Flag (RF) in the IP header are used to mark packets. Each packet is marked when it enters the network. This mark remains unchanged for as long as the packet traverses the network. This automatically removes the issue of mark spoofing which other marking schemes have to account for. The packet is marked by the interface closest to the source of the packet on an edge ingress router, as shown in FIG. 1. The routers with the engraved "DPM" signify the routers with DPM enabled, and the rubber-stamps signify the interfaces on these routers that actually perform the marking. The mark contains the partial address information of this interface, and will be addressed later herein. The interface makes a distinction between incoming and outgoing packets. Incoming packets are marked; outgoing packets are not marked. This ensures that the egress router will not overwrite the mark in a packet placed by an ingress router.

For illustrative purposes, assume that the Internet is a network with a single administration. In this case, only interfaces closest to the customers on the edge routers will participate in packet marking. Every incoming packet will be marked. Should an attacker attempt to spoof the mark in order to deceive the victim, this spoofed mark will be overwritten with a correct mark by the very first router the packet traverses. A continuous perimeter of DPM enabled interfaces should be maintained. The deployment should start with the largest, tier-1, ISPs and expand in concentric circles until the ingress interfaces are enabled. When an interface becomes enabled, other interfaces, which are closer to the tier-1 ISPs and are traversed by the marked packets should be disabled.

Procedure

A 32-bit IP address needs to be passed to the victim. A total of 17 bits are available to pass this information: 16-bit ID field and 1-bit RF. Clearly, a single packet would not be enough to carry the whole IP address in the available 17 bits. Therefore, it will take at least two packets to transport the whole IP address. An IP address is split into two segments, 16 bits each: segment 0—bits 0 through 15, and segment 1—bits 16 through 31. The marks are prepared in advance in order to decrease the per packet processing. Each mark has two fields: Segment Number and Address bits. With equal probability, the 17-bit field comprised of the ID field and RF of each incoming packet will be populated with either of those two marks.

At the victim, a table matching the source addresses to the ingress addresses is maintained. When a marked packet arrives at the victim, the victim will first determine if the given packet is an attack packet. If it is, the victim would check to see if the table entry for a source address of this packet already exists, and create it if it does not. Then, it writes address bits of the segment into the corresponding bits of the ingress IP address value. After both segments corresponding to the same ingress address have arrived at the destination, the ingress address for a given source address becomes available to the victim. The details of the procedure are shown in FIG. 2.

Multiple Attackers and IP Source Address Inconsistency

The limitation of the basic DPM in handling a certain type of DDoS attacks lies in the fact that the destination would associate segments of the ingress address with the source address of the attacker. If it could be guaranteed that only one host participating in the attack has a given source address, even though it might have been spoofed, and that the attacker would not change its address during the attack, the basic DPM would be sufficient. There are two situations when the reconstruction procedure of the basic DPM is inadequate. First, is the situation where two hosts with the same SA attack the victim. The ingress addresses corresponding to these two attackers are $A_0$ and $A_1$, respectively. The victim would receive four address segments: $A_0$ [0], $A_0$ [1], $A_1$ [0], and $A_1$ [1]. The victim, not being equipped to handle such attack, would eventually reconstruct four ingress addresses since four permutations are ultimately possible: $A_0$ [0], $A_0$ [1], $A_0$ [0].$A_1$ [1], $A_1$ [0].$A_0$ [1], and $A_1$ [0].$A_1$ [1], where '.' denotes concatenation. Only two of the four would be valid.

A typical metric of evaluation of the traceback schemes for DDoS attacks is the rate of false positives or false positive rate. In the context of DPM, a false positive is defined as an incorrectly identified ingress address. The rate of false positives refers to the ratio of the incorrectly identified ingress addresses to the total number of identified ingress addresses. In the above example, the false positive rate for that particular attack is 50%. Clearly, the false positive rate would increase even further if the number of attackers, with the same SA, was larger.

Second, consider a (D)DoS attack, where the attackers change their source addresses for every packet they send. The basic DPM will be unable to reconstruct any valid ingress addresses since none of the entries in the IngressTbl would have a complete ingress address.

General Principle of Handling DDoS Attacks

A general principle in handling (D)DoS attacks of these types is to rely only on the information transferred in the DPM mark. The DPM mark can be used to not only transfer the bits of the ingress address but also some other information. This additional information should enable the destination to determine which ingress address segments belong to which ingress address.

The reconstruction procedure utilizes the data structure called Reconstruction Table (RecTbl). The destination first puts the address segments in RecTbl, and then only after correctly identifying the ingress address out of the many possible address segments permutations, transfers it to IngressTbl.

Single Digest Modification to DPM

The scheme described here utilizes a hash function, H(x). To simplify the performance analysis, the hash function is assumed to be ideal. It is also assumed that the hash function is known to everybody, including all DPM-enabled interfaces, all destinations which intend to utilize DPM marks for traceback, and the attackers. The constraint of 17 bits still remains, and so a longer digest would result in fewer bits of the actual address transmitted in each mark, and consequently, the higher number of packets required for traceback.

Mark Encoding

In the basic DPM, the ingress address was divided into two segments. In this modified scheme, the ingress address is divided into k segments. Also, more bits are required to identify the segment. Instead of a single bit required for two segments in the basic DPM, $\log_2(k)$ are required for this scheme. The remaining bits are be used for the digest. Independently of which segment of the address is being sent to the victim, the digest portion of the mark will always remain the same for a given DPM interface. This enables the victim to associate the segments of the ingress address with each other to reconstruct the whole address.

Figure 3:
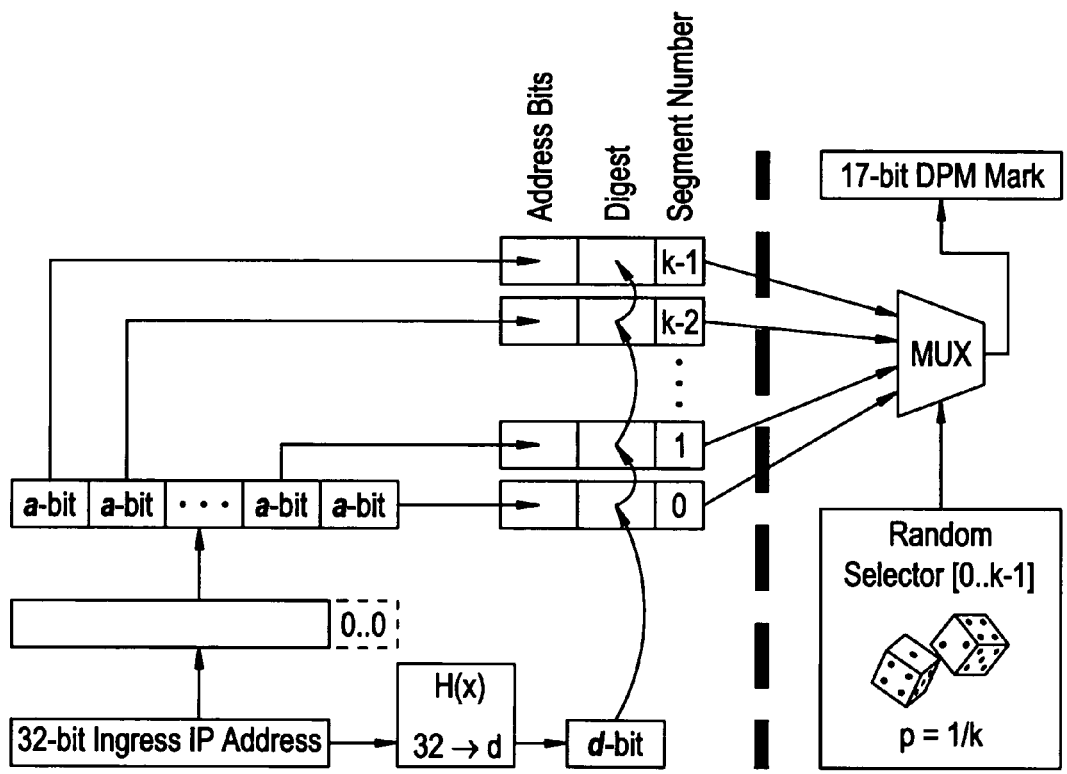
FIG. 3 depicts mark encoding for single digest DDoS modification.

FIG. 3 shows the schematics of the approach. The DPM mark consists of three fields: a-bit address segment field, d-bit digest field, and s-bit segment number field. Some padding may be required so that the address is split into segments of equal length.

At startup the DPM-enabled interface prepares k marks for all segments of the address. A d-bit hash value, or digest, of the ingress address is calculated once and then inserted in the digest field of every mark. Each of the k marks has address bits set to a different segment of the ingress address. The segment number field is set to the appropriate value. These operations are shown to the left of the bold dotted line in FIG. 3. The processing required for every packet will be limited to generating a small random number from 0 to k−1 and inserting a corresponding mark into the packet header.

Reconstruction by the Victim

The reconstruction procedure of this scheme consists of two separate processes: Mark Recording and Ingress Address Recovery. The reason for separating these two tasks is that the attack packets may arrive at the destination faster than they can be analyzed. The mark recording process sets the appropriate bits in RecTbl to indicate which marks have arrived at the destination. Address recovery checks those bits, composes address segment permutations, and determines which ones are valid ingress addresses.

Figure 4:
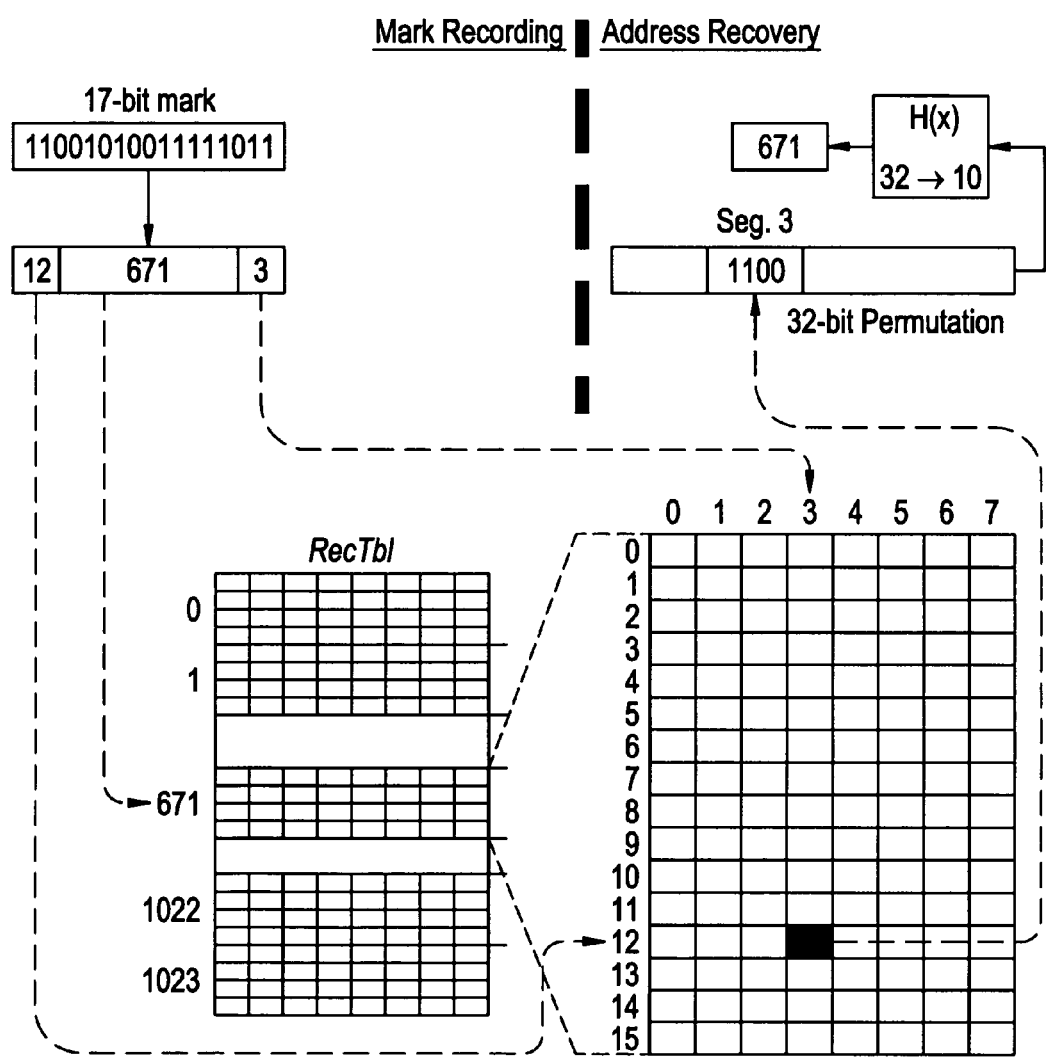
FIG. 4 illustrates RecTbl with k=8, d=10, a=4; mark recording; and address recovery.

RecTbl is a $2^{17}$ bit structure, where every possible mark can be uniquely represented. It consists of $2^d$ areas. Each area consists of k segments, and each segment consists of $2^a$ bits. FIG. 4 shows an example of RecTbl, where k, d, and a are 8, 10 and 4, respectively. When a mark becomes available to the mark recording process, it sets the appropriate bit in the RecTbl. For a given attacker, the ingress address can possibly be hashed into $2^d$ digest values. The digest is extracted from the mark and the area where the bit will be set is determined. The segment number field in the mark indicates the segment in the RecTbl area, where the appropriate bit would be set. Finally, the value of the address bits in the mark indicates the actual bit, which will be set to '1'. This process is repeated for every mark.

The address recovery process is a part of a larger traceback procedure. It analyzes each area of the RecTbl. Once again, it runs independently from the mark recording process, thus allowing post-mortem traceback. The value of a certain bit in RecTbl indicates that the corresponding mark has arrived at the victim. For example, bit 12 in segment 3 of area 671 set to '1' means that there is an ingress address of interest, with digest of 671 having segment 3 equal to '1100'$_2$ as shown in FIG. 4. This segment has to be combined with other segments of this area in order to create permutations of segments. Hash function, H(x), is applied to each of these permutations. If the result matches the area number, which is actually the digest embedded in the marks (in this example 671), then the recovery process concludes that this permutation of segments is in fact a valid ingress address.

Analysis

Regarding the number of attackers, N, that this modified scheme can traceback with the false positive rate limited to 1%, we first consider the origin of false positives. If there is only one ingress address with a given digest, there will be no false positives; however, as N increases, the chance of the digest repeated for another address also increases. The expected number of digests for a certain number of N can be thought of as the expected number of the faces turning up on a $2^d$-sided die after N throws. This is a special case of a classical occupancy problem. See W. Feller, *An Introduction to Probability Theory and Its Applications*, John Wiley & Sons, Inc., 1968. The expected number of different digests, E[H], is:

$$E[H] = 2^d - 2^d\left(1 - \frac{1}{2^d}\right)^N. \tag{1}$$

Therefore, the rate of false positives is 0 for the values of N, for which the expected number of digests, E[H], equals to N, since every ingress address will have a unique digest.

Since there may be more than one address resulting in the same digest, each segment associated with a given digest would have a certain number of values. For example, if two addresses have the same digest, segment 0 in the area of the RecTbl corresponding to this digest could have either one or two bits set to '1'. If segment 0 in these two addresses is the same, then there would be only one bit set to '1', and if segment 0 of one address is different from segment 0 of the second address, then two bits will be set to '1'. The expected number of values that a segment will assume can also be thought of as the expected number of the faces turning up on a $2^a$-sided die after $N_d$ throws [Feller, op. cit.], where $N_d$ is the number of ingress addresses with the same digest. The expected number of different values the segment will take is $$2^a - 2^a \left(1 - \frac{1}{2^a}\right)^{N_d}, \quad (2)$$

for those areas, which have segments of more than one ingress addresses, and 1 for those which have segments of only a single ingress address. The expected number of all permutations of address segments for a given digest is $$\left[2^a - 2^a \left(1 - \frac{1}{2^a}\right)^{N_d}\right]^k.$$

Recall that after a permutation of segments is obtained, the hash function H(x) is applied to it, and if the result does not match the original digest, that permutation is not considered. The expected number of permutations that result in a given digest for a given area of the RecTbl is $$\frac{\left[2^a - 2^a \left(1 - \frac{1}{2^a}\right)^{N_d}\right]^k}{2^d}.$$

The number of false positives for a given area would be the total number of permutations, less the number of valid ingress addresses, which match the digest. For this modification, just a few areas, which have segments of more than one ingress addresses, will produce more than 0.01N of false positives. We assume that for all those areas $N_d=2$. The number of those areas is N–E[H], and the number of valid ingress addresses with segments in those areas is 2(N–E[H]). The number of false positives is given by $$\frac{(N - E[H])\left[2^a - 2^a \left(1 - \frac{1}{2^a}\right)^2\right]^k - 2(N - E[H])}{2^d} \quad (3)$$

This number has to be less than 1% of N. Therefore, Eq. (3) has to be set to be less or equal to 0.01N, and solved for N. Recall that a, d, and E[H] can be expressed in terms of k. The maximum N, $N_{MAX}$, which would satisfy this inequality, is difficult to be expressed in terms of k. However, it is possible to find $N_{MAX}$ by substitution. Table tab:single provides the values of $N_{MAX}$ for selected k. Another important consideration is the expected number of datagrams required for reconstruction. This number is related to k, the number of segments that the ingress address was split. The larger the k, the more different packets it would be required for the victim to receive in order to reconstruct the ingress address. The expected number of datagrams, E[D], required to be marked by a single DPM-enabled interface in order for the victim to be able to reconstruct its ingress address is given by the Coupon Collector problem [Feller op. cit.]:

$$E[D] = k\left(\frac{1}{k} + \frac{1}{k-1} + \ldots + 1\right).$$

Table I provides the value of E[D] for selected values of k.

TABLE I

| k | A | s | d | $N_{MAX}$ | E[D] |
|---|---|---|---|---|---|
| 2 | 16 | 1 | 0 | 1 | 3 |
| 4 | 8 | 2 | 7 | 26 | 9 |
| 8 | 4 | 3 | 10 | 108 | 22 |
| 16 | 2 | 4 | 11 | 45 | 55 |
| 32 | 1 | 5 | 11 | 45 | 130 |

Multiple Digest DDoS Modification to DPM

In the scheme described above, a single hash function, H(x), was used for identifying segments of an ingress address. While this allows for identifying several ingress addresses of simultaneous attackers, this number is not sufficient for the real attacks. A modification, requiring a family of hash functions, is now considered.

Mark Encoding

In this scheme, the family of $f$ hash functions, $H_0(x)$ through $H_{f-1}(x)$, is used to produce $f$ digests of the ingress address. As in the single digest scheme, the address segment and the segment number are transferred in each mark. Instead of the single digest, however, one of the several digests produced by each of $f$ hash functions concatenated with the function identifier is embedded in the mark. The d-bit field, which was used solely for the digest in the single-digest scheme, is split into two fields: $\log_2(f)$-bit long field carrying the identifier of the hash function, and d-bit field with the digest itself.

Figure 5:
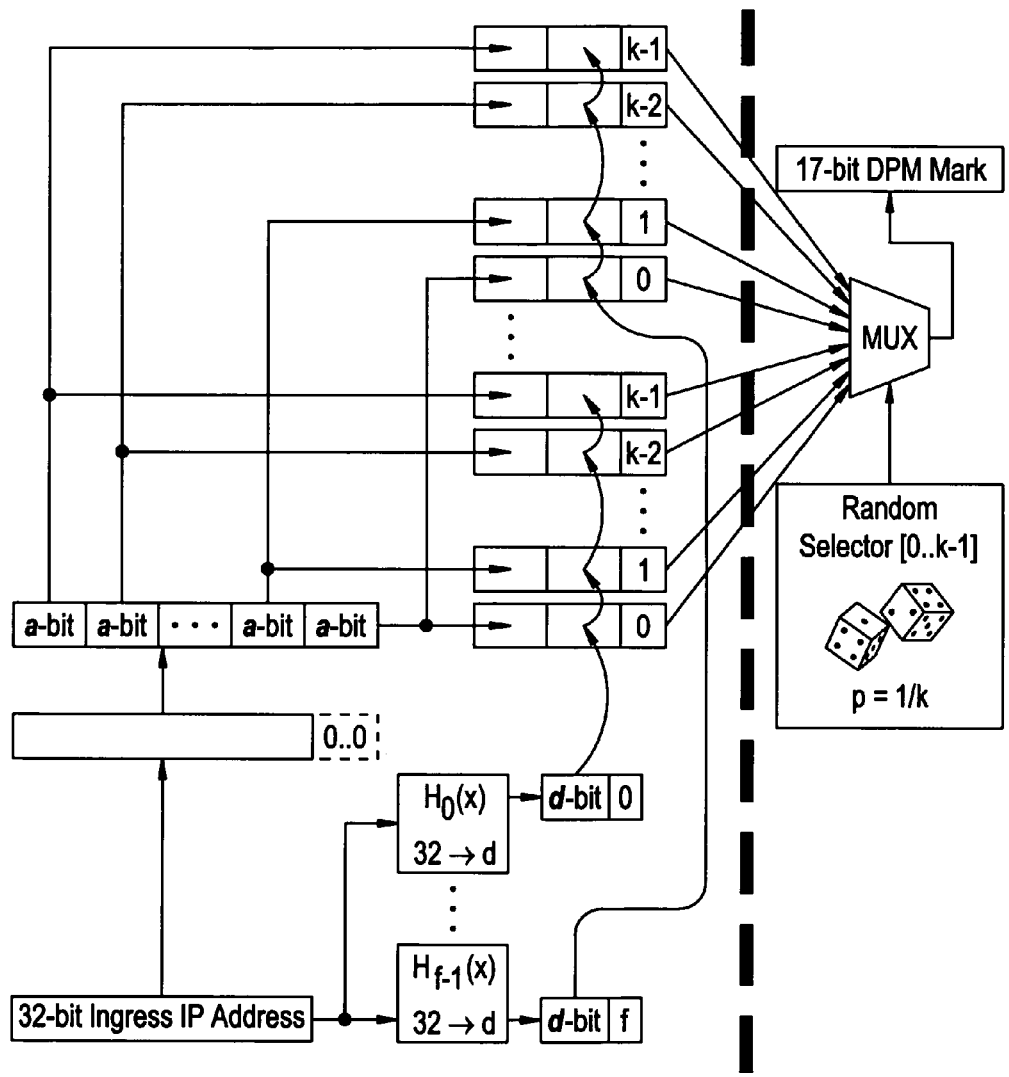
FIG. 5 shows encoding for multiple digest DDoS modification.

FIG. 5 illustrates the process of the mark encoding. The process is very similar to the one described in the single digest modification, but differs in that for every ingress address, not k, but $f \times k$ marks have to be created at startup and then randomly selected for every packet. This does not affect the DPM-enabled interface per-packet overhead since per-packet will be limited to generating a small random number and overwriting 17 bits in the header, just as for the single-digest or basic DPM schemes.

Reconstruction by the Destination

Reconstruction by the destination is also similar to that described in the single digest modification. The structure of RecTbl has to be changed slightly. The RecTbl will consist of $f$ smaller parts. Every one of those parts will have the structure identical to the RecTbl described in Section sec:MultSingleReconstruction ($2^d$ areas, k segments in every area, and $2^a$ bits in every segment). The mark recording process first examines the hash function identifier field. Then it proceeds to the corresponding part of the RecTbl. Having identified the part in the RecTbl, the area, and the segment, the appropriate bit is set to '1', as in the single-digest scheme.

Figure 6:
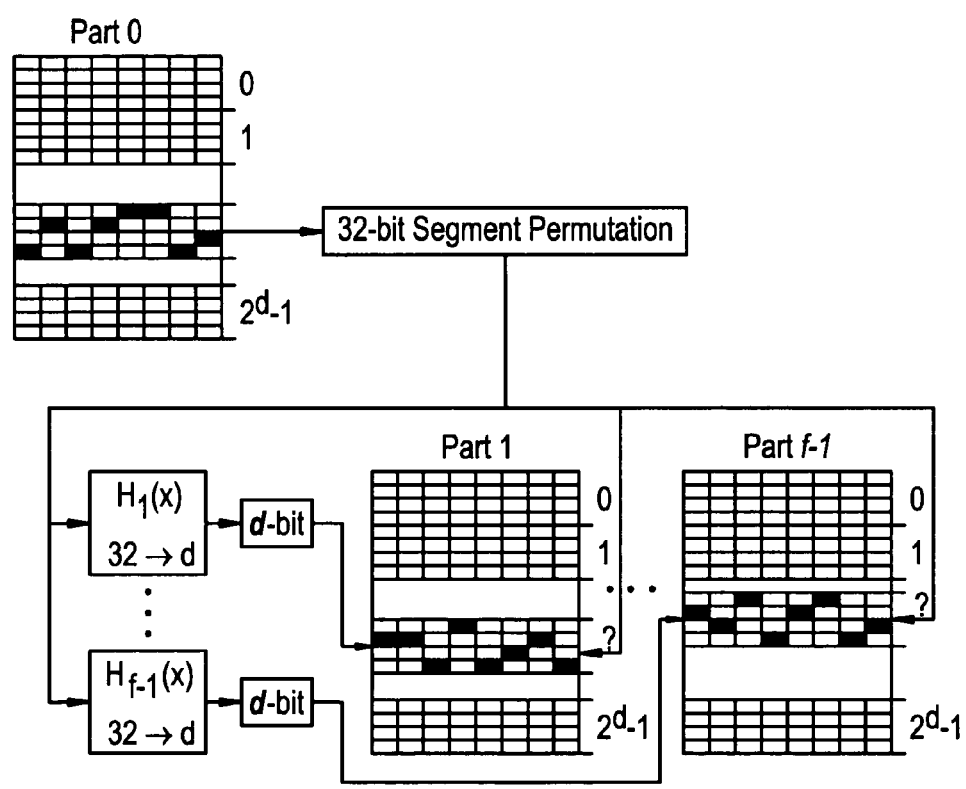
FIG. 6 illustrates address recovery for the multiple digest DDoS modification.

The address recovery process, shown in FIG. 6, identifies the permutations which match the digest in areas of Part0 of RecTbl. Once a permutation is validated by comparing its digest obtained by applying '$H_0(x)$ to the area number, the rest of the hash functions, $H_1(x)$ to $H_{f-1}(x)$, are applied to it to produce $f-1$ digests. These digests are used to verify the existence of this permutation in other parts of RecTbl. The process then checks these areas of the remaining parts for the permutation in question. If the permutation is present in the appropriate area of every part of the RecTbl, it is concluded that the permutation is a valid ingress address. Notice that the permutation does not have to be verified in every part. It is known that the digest obtained by applying $H_t(x)$ to the permutation being checked will match the area number since the area was identified by this operation. Therefore, such verification would be redundant and will always produce a positive outcome. The pseudo code in FIG. 7 provides the details of the mark encoding, mark recording, and address recovery processes.

Analysis

Again here we consider for this scheme that the purpose remains the same: to find $N_{MAX}$, the maximum number of simultaneous attackers, which can be traced back with the false positive rate not exceeding 1%. For the multiple digest scheme, the number of false positives in one area of RecTbl can be higher than in a single digest scheme because the same false positive has to appear in the appropriate areas of all other parts of RecTbl in order to be identified as an ingress address.

Recall, from the single digest case, that the expected number of permutations in a given digest is given by $$\left[2^a - 2^a\left(1 - \frac{1}{2^a}\right)^{N_d}\right]^k,$$

where $N_d$ is the number of ingress addresses with this digest. Since for the multiple digest scheme, unlike the single digest scheme, the number of ingress addresses with the same digest will be more than 2, the following analysis is more suitable. The number of ingress addresses with the same digest is $$\frac{N}{E[H]}.$$

The number of permutations in a single digest is then $$\left[2^a - 2^a\left(1 - \frac{1}{2^a}\right)^{\frac{N}{E[H]}}\right]^k.$$

The number of false positives for this digest is $$\frac{\left[2^a - 2^a\left(1 - \frac{1}{2^a}\right)^{\frac{N}{E[H]}}\right]^k - N}{2^d}.$$

The number of false positives in Part0 is given by:

$$\frac{E[H]}{2^d}\left(\left[2^a - 2^a\left(1 - \frac{1}{2^a}\right)^{\frac{N}{E[H]}}\right]^k - N\right).$$

For large values of N, $E[H]=2^d$, and thus $$\frac{E[H]}{2^d} = 1.$$

So the number of false positives in Part0 is $$\left[2^a - 2^a\left(1 - \frac{1}{2^a}\right)^{\frac{N}{E[H]}}\right]^k - N. \quad (4)$$

Once the permutation was identified as a possible ingress address in Part0, the remaining digests are calculated. Since we assume uniform distribution of addresses, any permutation is as likely to appear as any other. The probability of any random permutation to appear is $$\frac{1}{2^{32}}.$$

The probability that a given permutation, which is a false positive, will occur in the appropriate area of Part1 is:

$$\frac{\left[2^a - 2^a\left(1 - \frac{1}{2^a}\right)^{\frac{N}{E[H]}}\right]^k}{2^{32}}$$

This expression is not divided by $2^d$ because if the permutation in question is present in the identified areas of all other parts, it must match the appropriate digest per discussion at the end of Section sec:MultMultipleReconstruciton. The probability that a given permutation will occur in the appropriate areas of all parts of RecTbl is:

$$\left[\frac{\left[2^a - 2^a\left(1 - \frac{1}{2^a}\right)^{\frac{N}{E[H]}}\right]^k}{2^{32}}\right]^{f-1}$$

Multiplying this expression by the number of false positives in Part0 results in the number of false positives, after areas matching the digests 1 through $f$-1 in all the other parts of the RecTbl were checked. This is the total number of false positives for the RecTbl. Setting it not to exceed $$\frac{N}{100}$$

results in the following inequality:

$$\frac{\left\{\left[2^a - 2^a\left(1 - \frac{1}{2^a}\right)^{\frac{N}{E[H]}}\right]^k\right\}^f}{2^{32(f-1)}} \leq \frac{N}{100}$$

Recall that a, d, and E[H] can be expressed in terms of k. So, the whole inequality can be expressed in terms of k and f. Similar to the single-digest scheme, $N_{MAX}$ can be found by substitution.

The expected number of datagrams required to reconstruct the ingress address is now given by $$E[D] = f \times k \left( \frac{1}{f \times k} + \frac{1}{f \times k - 1} + \ldots + 1 \right).$$

Table II provides the values of $N_{MAX}$ and E[D] for selected combinations of f, a, k, and d.

TABLE II

| F | k | a | d | $N_{MAX}$ | E[D] |
|---|---|---|---|-----------|------|
| 4 | 8 | 4 | 8 | 2911 | 130 |
| 4 | 4 | 8 | 5 | 2296 | 55 |
| 8 | 4 | 8 | 4 | 2479 | 130 |

The multiple digest modification is able to reconstruct more ingress addresses of simultaneous attackers than a single digest modification without increasing E[D].

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method of marking packets received by a network communication device, the method comprising:
    modifying each received packet by writing information comprising one or more bits of the network address of the network communication device into the received packet, wherein the information written into the received packet comprises a set of bits including one or more consecutive bits of the network address, a digest of the entire network address, and an identifier of the set of bits; and
    forwarding the modified packet.

2. The method of claim 1 wherein the network communication device is a router interface.

3. The method of claim 1, wherein the set of bits of the network address written into the packet is selected at random, for each received packet, from among a collection of sets of bits corresponding to non-overlapping sets of bits of the network address.

4. The method of claim 1 wherein the information is written in a header of the packet.

5. The method of claim 1 wherein the packet is an Internet Protocol (IP) version 4 packet.

6. The method of claim 5 wherein the information is written into identification field and reserved flag field of the packet.

7. The method of claim 1 wherein the packet is an Internet Protocol (IP) version 6 packet.

8. A method in accordance with claim 1, further comprising:
    at startup, preparing k marks corresponding to respective non-overlapping, equal-length segments of the network address, wherein a respective mark includes three fields: a-bit address segment field, d-bit digest field, and s-bit segment number field;
    calculating once and inserting in a digest field of every mark a d-bit hash value, of the network address, each of the k marks having address segment bits set to a different segment of the network address, and the segment number field being set to a value corresponding to the address segment; and
    generating a small random number from 0 to k−1 and inserting a corresponding mark into the received packet as said information.

9. A method in accordance with claim 1, wherein a family of f hash functions, $H_0(x)$ through $H_{f-1}(x)$, is used to produce f digests of the network address, and wherein the digest of the entire network address includes a selected one of the digests produced by the f hash functions concatenated with a hash function identifier corresponding to the hash function used to produce the selected one of the digests.

10. A communication device comprising:
    an input interface for receiving one or more packets;
    a processor configured to modify each received packet by writing into the received racket information comprising a set of bits including one or more consecutive bits of a network address of the communication device, a digest of the entire network address, and an identifier of the set of bits; and
    an output interface for forwarding the modified packets.

11. A method for identifying, by a device at a victim destination of an anonymous attack in a network in which the victim destination resides, a source of the anonymous attack, the method comprising:
    receiving at the victim destination sufficient ones of marked packets to recover an entire ingress address corresponding to at least a subset of the packets, wherein each packet entering the network is marked by an ingress node through which the packet enters the network, with information including a set of bits comprising one or more consecutive bits of a network address of the ingress node, a digest of the entire network address of the ingress node, and an identifier of the set of bits, and wherein the information remains unchanged for as long as the packet traverses the network; and
    correlating the recovered ingress address with the source address of the associated packets upon entering the network, to thereby identify the ingress address for the source address.

12. A method in accordance with claim 11, wherein the node comprises a said packet entering the network is marker an edge ingress router.

13. A method in accordance with claim 12, wherein incoming packets to the network are marked and outgoing packets leaving the network are not marked, thereby assuring that an egress router will not overwrite the marks placed by said ingress router.

14. A method in accordance with claim 13, wherein a continuous perimeter of marking enabled interfaces is maintained.

15. A method in accordance with claim 11, wherein said correlating is enabled by an ingress table maintained at said victim for matching source addresses to ingress addresses.

16. A method in accordance with claim 15, further including placing the said ingress address segments at the victim destination in a reconstruction table, identifying the ingress address out of the possible permutations of the segments, and transferring the identified ingress address to said ingress table.

17. A method in accordance with claim 16, wherein a single hash function is used for identifying the segments of an ingress address.

18. A method in accordance with claim 16, wherein a family of hash functions is used for identifying the segments of an ingress address.

19. A method in accordance with claim 16, wherein a family of f hash functions, $H_0(x)$ through $H_{f-1}(x)$, is used to produce f digests of the network address of the ingress node, and wherein the digest of the entire network address of the ingress node includes a selected one of the digests produced by the $f$ hash functions concatenated with a hash function identifier corresponding to the hash function used to produce the selected one of the digests.

20. A method in accordance with claim 19, wherein the ingress node follows an algorithm corresponding to the pseudo code given by:

```
Marking procedure at router R, edge interface A:
    for z = 0 to f − 1
        Digest:= H_z(A)
        for y = 0 to k − 1
            Marks[z × k + y].Hash_num := z
            Marks[z × k + y].Digest := Digest
            Marks[z × k + y].Seg_Num := y
            Marks[z × k + y].A_bits := A[y]
    for each incoming packet w
        let x be a random integer from [0, f × k)
        write Marks[x] into w.Mark
Mark Recording procedure at victim V:
    for each attack packet w
        Part := w.Mark.Hash_num
        Area := w.Mark.Digest
        Seg := w.Mark.Seg_Num
        Bit := w.Mark.A_bits
        RecTbl[Part, Area, Seg, Bit] := '1'
Address Recovery procedure at victim V:
    for Area = 0 to 2^d − 1
        for Bit_0 = 0 to 2^a − 1
            if RecTbl[0, Area, 0, Bit_0] == '1' then
        if RecTbl[0, Area, k − 2, Bit_{k−2}] == '1' then
            for Bit_{k−i} = 0 to 2^a − 1
                if RecTbl[0, Area, k − 1, Bit_{k−1}] == '1' then
                    Prm := Bit_0 . Bit_1 . … . Bit_{k−1}
                    Digest := H_0(Prm)
                    if Area == Digest then
                        for Part = 0 to f − 1
                            for Seg = 0 to k − 1
                                if RecTbl[Part, H_{Part}(Prm),
                                →      Seg, Bit_{Seg}] ≠ '1' then
                                    False_flag := '1'
                        if False_flag ≠ '1' then
                            Prm ⇒ IngressTbl.
```

21. A method in accordance with claim 11, wherein the one or more consecutive bits correspond to an a-bit address field, the digest corresponds to a d-bit digest field, and the identifier corresponds to an s-bit segment number field, and wherein the one or more consecutive bits are chosen from among a number, k, of different sets of one or more consecutive bits of the network address of the ingress node, the method further comprising:

reconstructing said entire ingress address at the victim destination, said reconstructing including:

mark recording, said mark recording including:

setting the appropriate bits in a reconstruction table to indicate which marks have arrived at the destination, said marks corresponding to the information used to mark respective packets, said reconstruction table comprising a structure where every possible mark can be uniquely represented, the reconstruction table having $2^d$ areas of k segments each, and each segment consisting of $2^a$ bits;

setting an appropriate bit in the reconstruction table when a mark becomes available to the mark recording process; and extracting the digest from the mark and determining the area where the bit will be set, wherein the segment number field in the mark indicates the segment in the reconstruction table area where the appropriate bit would be set, and wherein the value of the bits in the address value of the mark indicate the actual bit, which will be set to '1';

repeating the mark recording for every mark received at the victim destination; and ingress address recovery, said ingress address recovery including:

recovering the address by checking the bits from the mark recording for every mark;

composing address segment permutations; and determining which ones are valid ingress addresses.

\* \* \* \* \*